United States Patent
Scott et al.

(10) Patent No.: US 6,272,562 B1
(45) Date of Patent: Aug. 7, 2001

(54) ACCESS CONTROL UNIT INTERFACE

(75) Inventors: Walter Guy Scott, North Palm Beach; David Brunell, West Palm Beach; Matthew Kahn, Boynton Beach; George William McClurg, Jenson Beach, all of FL (US)

(73) Assignee: Cross Match Technologies, Inc., West Palm Beach, FL (US)

( * ) Notice: Subject to any disclaimer, the term of this patent is extended or adjusted under 35 U.S.C. 154(b) by 0 days.

(21) Appl. No.: 09/321,533

(22) Filed: May 28, 1999

(51) Int. Cl.[7] .................................................. G06F 13/14

(52) U.S. Cl. .......................... 710/16; 710/129; 355/411; 382/124

(58) Field of Search .............................. 710/16, 66, 100, 710/101, 126, 129; 455/411; 382/124

(56) References Cited

U.S. PATENT DOCUMENTS

| | | | |
|---|---|---|---|
| D. 348,445 | 7/1994 | Fishbine et al. | D14/107 |
| D. 351,144 | 10/1994 | Fishbine et al. | D14/107 |
| 2,500,017 | 3/1950 | Altman | 88/57 |
| 3,200,701 | 8/1965 | White | 88/14 |
| 3,482,498 | 12/1969 | Becker | 95/12 |
| 3,527,535 | 9/1970 | Monroe | 356/71 |
| 3,617,120 | 11/1971 | Roka | 353/28 |
| 3,947,128 | 3/1976 | Weinberger et al. | 356/71 |
| 3,968,476 | 7/1976 | McMahon | 340/146.3 E |
| 4,063,226 | 12/1977 | Kozma et al. | 365/125 |
| 4,210,899 | 7/1980 | Swonger et al. | 340/146.3 E |
| 4,414,684 | 11/1983 | Blonder | 382/4 |
| 4,537,484 | 8/1985 | Fowler et al. | 354/62 |
| 4,544,267 | 10/1985 | Schiller | 356/71 |
| 4,681,435 | 7/1987 | Kubota et al. | 356/71 |

(List continued on next page.)

FOREIGN PATENT DOCUMENTS

| | | | |
|---|---|---|---|
| 0 101 772 A1 | 3/1984 | (EP) | G07C/9/00 |
| 0 308 162 A2 | 3/1989 | (EP) | A61B/5/10 |
| 0 379 333 A1 | 7/1990 | (EP) | G07F/7/10 |
| 0 379 333 B1 | 7/1995 | (EP) | G07F/7/10 |
| 0 905 646 A1 | 3/1999 | (EP) | G06K/11/18 |
| 2 089 545 | 6/1982 | (GB) | G06K/9/20 |
| WO 87/02491 | 4/1987 | (WO) | G07C/9/00 |
| WO 90/03620 | 4/1990 | (WO) | G06K/9/20 |
| WO 92/11608 | 7/1992 | (WO) | G06K/9/00 |
| WO 94/22371 | 10/1994 | (WO) | A61B/5/117 |
| WO 96/17480 | 6/1996 | (WO) | H04N/13/93 |
| WO 97/29477 | 8/1997 | (WO) | G09G/5/08 |
| WO 98/12670 | 3/1998 | (WO) | G07C/9/00 |
| WO 99/12123 | 3/1999 | (WO) | G06K/9/00 |

OTHER PUBLICATIONS

Btt (Biometric Technology Today), Finger technologies contacts, 2 pages.

Drake, M.D. et al., "Waveguide hologram fingerprint entry device," *Optical Engineering*, vol. 35, No. 9, Sep. 1996, pp. 2499–2505.

(List continued on next page.)

*Primary Examiner*—Thomas Lee
*Assistant Examiner*—Abdelmoniem Elamin
(74) *Attorney, Agent, or Firm*—Sterne, Kessler, Goldstein & Fox, PLLC

(57) ABSTRACT

An access control unit interface between a fingerprint scanner and a host processor is described. A daughter card is coupled between the fingerprint scanner, various access control peripherals, and the host processor. The host processor can be any commercially available processor. The daughter card handles real-time and interactive access control events. The daughter card may include an access control interface processor. The access control interface processor may include a display interface module, a keyboard module, a Wiegand interface module, a finger detect interface module, a LED interface module, and a serial communication module.

31 Claims, 8 Drawing Sheets

U.S. PATENT DOCUMENTS

| | | | |
|---|---|---|---|
| 4,792,226 | 12/1988 | Fishbine et al. | 356/71 |
| 4,811,414 | 3/1989 | Fishbine et al. | 382/52 |
| 4,876,726 | 10/1989 | Capello et al. | 382/4 |
| 4,924,085 | 5/1990 | Kato et al. | 250/227.28 |
| 4,933,976 | 6/1990 | Fishbine et al. | 382/4 |
| 4,995,086 | 2/1991 | Lilley et al. | 382/4 |
| 5,054,090 | 10/1991 | Knight et al. | 382/4 |
| 5,067,162 | 11/1991 | Driscoll, Jr. et al. | 382/5 |
| 5,067,749 | 11/1991 | Land | 283/117 |
| 5,131,038 | 7/1992 | Puhl et al. | 380/23 |
| 5,146,102 | 9/1992 | Higuchi et al. | 250/556 |
| 5,187,747 | 2/1993 | Capello et al. | 382/4 |
| 5,222,152 | 6/1993 | Fishbine et al. | 382/2 |
| 5,230,025 | 7/1993 | Fishbine et al. | 382/4 |
| 5,233,404 | 8/1993 | Lougheed et al. | 356/71 |
| 5,249,370 | 10/1993 | Stanger et al. | 34/22 |
| 5,384,621 | 1/1995 | Hatch et al. | 355/204 |
| 5,416,573 | 5/1995 | Sartor, Jr. | 356/71 |
| 5,467,403 | 11/1995 | Fishbine et al. | 382/116 |
| 5,473,144 | 12/1995 | Mathurin, Jr. | 235/380 |
| 5,517,528 | 5/1996 | Johnson | 375/259 |
| 5,528,355 | 6/1996 | Maase et al. | 356/71 |
| 5,548,394 | 8/1996 | Giles et al. | 356/71 |
| 5,591,949 | 1/1997 | Bernstein | 235/380 |
| 5,596,454 | 1/1997 | Hebert | 359/726 |
| 5,613,014 | 3/1997 | Eshera et al. | 382/124 |
| 5,615,277 | 3/1997 | Hoffman | 382/115 |
| 5,625,448 | 4/1997 | Ranalli et al. | 356/71 |
| 5,640,422 | 6/1997 | Johnson et al. | 375/259 |
| 5,649,128 * | 7/1997 | Hartley | 710/129 |
| 5,650,842 | 7/1997 | Maase et al. | 356/71 |
| 5,661,451 | 8/1997 | Pollag | 340/426 |
| 5,680,205 | 10/1997 | Borza | 356/71 |
| 5,689,529 | 11/1997 | Johnson | 375/259 |
| 5,717,777 | 2/1998 | Wong et al. | 382/124 |
| 5,745,684 * | 4/1998 | Oskouy et al. | 709/250 |
| 5,748,766 | 5/1998 | Maase et al. | 382/124 |
| 5,755,748 | 5/1998 | Borza | 607/61 |
| 5,778,089 | 7/1998 | Borza | 382/124 |
| 5,781,647 | 7/1998 | Fishbine et al. | 382/1 |
| 5,793,218 * | 8/1998 | Oster et al. | 324/754 |
| 5,805,777 * | 9/1998 | Kuchta | 395/112 |
| 5,812,067 | 9/1998 | Bergholz et al. | 340/825.31 |
| 5,822,445 | 10/1998 | Wong | 382/127 |
| 5,825,474 | 10/1998 | Maase | 356/71 |
| 5,832,244 * | 11/1998 | Jolley et al. | 710/129 |
| 5,848,231 | 12/1998 | Teitelbaum et al. | 395/186 |
| 5,859,420 | 1/1999 | Borza | 250/208.1 |
| 5,867,802 | 2/1999 | Borza | 701/35 |
| 5,869,822 * | 2/1999 | Meadows, II et al. | 235/380 |
| 5,872,834 | 2/1999 | Teitelbaum | 379/93.03 |
| 5,900,993 | 5/1999 | Betensky | 359/710 |
| 5,907,627 | 5/1999 | Borza | 382/124 |
| 5,920,384 | 7/1999 | Borza | 356/71 |
| 5,928,347 * | 7/1999 | Jones | 710/129 |
| 5,960,100 * | 9/1999 | Hargrove | 382/124 |
| 5,973,731 * | 10/1999 | Schwab | 348/161 |
| 5,974,162 | 10/1999 | Metz et al. | 382/124 |
| 5,995,014 * | 11/1999 | DiMaria | 340/825.31 |
| 6,018,739 * | 1/2000 | McCoy et al. | 707/102 |
| 6,023,522 * | 2/2000 | Draganoff et al. | 382/124 |
| 6,041,372 * | 3/2000 | Hart et al. | 710/62 |
| 6,075,876 * | 6/2000 | Draganoff | 382/124 |
| 6,078,265 * | 6/2000 | Bonder et al. | 340/825.31 |
| 6,088,585 * | 7/2000 | Schmitt et al. | 455/411 |

OTHER PUBLICATIONS

Roethenbaugh, G. (ed.), *Biometrics Explained*, 1998, ICSA, pp. 1–34.

*Automated Identification Systems* (visited May 20, 1999) <http://www.trw.com/idsystems/bldgaccess2.html>, 1 page, Copyright 1999.

*Ultra–Scan Corporation Home Page* (visited May 20, 1999) <http://www.ultra–scan.com/index.htm>, 3 pages. (discusses technology as early as 1996).

*Profile* (last updated Aug. 16, 1998) <http://www.dermalog.de/Britain/Profile/profile.htm>, 3 pages. (discusses technology as early as 1990).

*ID–Card System Technical Specifications* (last updated Jul. 18, 1998) <http://dermalog.de/Britain/Products/ID–Card/idcard2.htm>, 2 pages.

*Fujitsu Limited Products and Services* (updated Apr. 21, 1999) <http://www.fujitsu.co.jp/hypertext/Products/index-e.html>, 3 pages, Copyright 1995–1999.

*SonyDCam* (visited May 20, 1999) <http://www.microsoft.com/DDK/ddkdocs/Win2k/sonydcam.html>, 3 pages, Copyright 1999.

*Verid Fingerprint Verification* (visited May 17, 1999) <http://www.tssi.co.uk/products/finger.html>, 2 pages.

*Startek's Fingerprint Verification Products: Fingerguard FG–40* (visited May 18, 1999) <http://www.startek.com.tw/product/fg40/fg40.html>, 3 pages.

*SAC Technologies Showcases Stand–Alone SAC-Remote(TM )* (visited May 18, 1999) <http://www.pathfinder.com/money/latest/press/PW/1998Mar25/1026.html>, 2 pages.

"Biometrics, The Future Is Now," *www.securitymagazine.com*, May 1999, pp. 25–26.

*Mytec Technologies Gateway*, (visited Apr. 27, 1999) <http://www.mytec.com/Products/gateway/>, 1 page.

*Mytec Technologies Gateway: Features & Benefits*, (visited Apr. 27, 1999) <http://www.mytec.com/Products/gateway/features.htm>, 1 page.

*Mytec Technologies Touchstone Pro*, (Visited Apr. 27, 1999) <http://www.mytec.com/Products/Touchstone/>, 1 page.

*Mytec Technologies Touchstone Pro: Features*, (visited Apr. 27, 1999) <http://www.mytec.com/Products/Touchstone/features.htm>, 1 page.

*Electronic Timeclock Systems and Biometric Readers* (last updated Apr. 17, 1999) <http://www.lfs–hr–bene.com/tclocks.html>, 1 page.

*Fingerprint Time Clock* (visited May 17, 1999) <http://www.lfs–hr–bene.com/Biometrics/Fingerprintclock.html>, 6 pages.

*KC–901: The KSI fingerprint sensor* (visited May 17, 1999) <http://kinetic.bc.ca/kc–901.html>, 3 pages.

*Intelnet Inc.* (visited May 20, 1999) <http://www.intelgate.com/index.html>, 1 page, Copyright 1996.

*Ver–i–Fus Fingerprint Access Control System* (visited May 20, 1999) <http://www.intelgate.com/verifus.htm>, 2 pages. (Ver–i–fus product released in 1995).

*Ver–i–fus® Configurations* (visited May 20, 1999) <http://www.intelgate.com/verconfig.htm>, 1 page. (Ver–i–fus product released in 1995).

*Ver–i–Fus® & Ver–i–Fus$^{mil®}$*(visited May 20, 1999) <http://www.intelgate.com/vif_data.htm>, 3 pages. (Ver–i–fus product released in 1995).

*Access Control System Configurations* (visited May 20, 1999) <http://www.intelgate.com/access.htm>, 2 pages. (Ver–i–fus product released in 1995).

*Company* (visited May 17, 1999) <http://www.instainfo.com.company.htm>, 2 pages.

*TouchLock™ II Fingerprint Identity Verification Terminal* (visited May 17, 1999) <http://www.identix.com/TLock.htm>, 4 pages.
*Physical Security and Staff Tracking Solutions* (visited May 17, 1999) <http://www.identix.com/products/biosecurity.html>, 3 pages, Copyright 1996–1998.
*Veriprint2000 Fingerprint Verification Terminal For Use With Jantek Time & Attendance Software* (visited May 17, 1999) <http://www.hunterequipment.com/fingerprint.htm>, 2 pages.
*Veriprint Product Applications* (visited Apr. 27, 1999) <http://www.biometricid.com/uses.htm>, 1 page, Copyright 1999.
*BII Home Page* (visited Apr. 27, 1999) <http://www.biometricid.com/homepage.htm>, 1 page, Copyright 1999.
*Veriprint 2100 Stand–Alone Fingerprint Verification Terminal* (visited Apr. 27, 1999) <http://www.biometricid.com/veriprint2100.htm>, 3 pages.
Randall, N., "A Serial Bus on Speed," *PC Magazine*, May 25, 1999, pp. 201–203.
*The DERMALOG Check–ID* (visited Nov. 12, 1999) <http://www.dermalog.de/ganzneu/products_check.html>, 1 page.
*Check–ID Specifications and Features* (visited Nov. 12, 1999) <http://www.dermalog.de/ganzneu/spec_check.html>, 1 page, Copyright 1999.
*Startek's Fingerprint Verification Products: FingerFile 1050* (visited Oct. 8, 1999) <http://www.startek.com.tw/product/ff1050/ff1050.html>, 3 pages.
*Time is Money!* (visited Jun. 5, 1998) <http://www.iaus.com/afim.htm>, 3 pages.
*LS 1 LiveScan Booking Workstation High Performance Finger & Palm Scanning System* (visited Jun. 4, 1998) <http://www.hbs–jena.com/ls1.htm>, 6 pages, Copyright 1998.
*Welcome to the Homepage of Heimann Biometric Systems BMGH* (visited Jun. 4, 1998) <http://www.hbs–jena.com/>, 1 page, Copyright 1998.
*Heimann Biometric Systems Corporate Overview* (visited Jun. 4, 1998) <http://www.hbs–jena.com/company.htm>, 4 pages, Copyright 1998.
*Remote Access Positive IDentification—raPID* (visited Jun. 3, 1998) <http://www.nec.com . . . >, 2 pages, Copyright 1997.
*Morpho DigiScan Cellular* (visited Jun. 3, 1998) <http://www.morpho.com/products/law_enforcement/digiscan/cellular.htm>, 2 pages, Copyright 1998.
*A.F.I.S.* (last updated Apr. 4, 1998) <http://www.dermalog.de/afis.htm>, 2 pages.
*Morpho FlexScan Workstation* (visited Jun. 3, 1998) <http://www.morpho.com/products/law_enforcement/flexscan/>, 2 pages, Copyright 1998.
True–ID® The LiveScan with special "ability" . . . , 2 pages.
*Printrak International: User List* (visited Jun. 3, 1998) <http://www.printrakinternational.com and links>, 10 page, Copyright 1996.
*Live–Scan Products: Tenprinter® 1133S* (visited Apr. 23, 1999) <http://www.digitalbiometrics.com/Products/tenprinter.htm>, 4 pages. (Tenprinter 1133S released in 1996).
*TouchPrint™ 600 Live–Scan System* (visited Apr. 23, 1999) <http://www.identix.com/products/livescan.htm>, 4 pages, Copyright 1996–1998.
Systems for Live–Scan Fingerprinting, Digital Biometrics, Inc., 8 pages, Copyright 1998.
DBI FingerPrinter CMS, Digital Biometrics, Inc., 5 pages. (CMS released in 1998).
Fingerscan V20, Indentix Incorporated, 1 page, Copyright 1999.
Verid Fingerprint Reader, TSSI, 4 pages.
Response to Request for Information, Cross Match Technologies, Inc., 12 pages, Apr. 14, 1999.
*Startek's Fingerprint Verification Products* (visited Nov. 17, 1999) <http://www.startek.com.tw/product/index.html>, 1 page.
*Introduction to Startek's Fingerprint Verification Products* (visited Nov. 17, 1999) <http://www.startek.com.tw/product/index2.html>, 2 pages.
*Automatic Fingerprint Identification Systems* (visited Nov. 17, 1999) <http://www.sagem.com/en/produit4–en/empreinte–dig–en.htm>, 1 page.
*Digital Biometrics Corporate Information* (visited Nov. 17, 1999) <http://www.digitalbiometrics.com/Corporate_info/Corporate_info.htm>, 2 pages. (discusses technology as early as 1985).
*DBI Live–Scan Products: Digital Biometrics TENPRINTER* (visited Nov. 17, 1999) <http://www.digitalbiometrics.com/products/tenprinter.htm>, 4 pages. (Tenprinter released in 1996).
*DBI Live–San Products: Networking Options* (visited Nov. 17,1 999) <http://ww.digitalbiometrics.com/products/networking_options.htm>, 3 pages.
*DBI Live–Scan Products: Digital Biometrics FingerPrinter CMS* (visited Nov. 17, 1999) <http://www.digitalbiometrics.com/products/FingerPrinterCMS.htm>, 3 pages. (CMS released in 1998).
*DBI Live–Scan Products: Image Printer Stations* (visited Nov. 17, 1999) <http://www.digitalbiometrics.com/products/imageprinter.htm>, 2 pages.
*DBI Live–Scan Products: FC–21 Fingerprint Capture Station* (visited Nov. 17, 1999) <http://www.digitalbiometrics.com/products/Fingerprintcapture.htm>, 2 pages.
*Series 400 OEM Scanner* (visited Nov. 17, 1999) <http://www.ultra–scan.com/400.htm>, 3 pages. (Scanner released in 1996).
*USC Scanner Design* (visited Nov. 17, 1999) <http://www.ultra–scan.com/scanner.htm>, 4 pages. (Scanner released in 1996).
*Series 500/600 Scanners* (visited Nov. 17, 1999) <http://www.ultra–scan.com/500.htm>, 3 pages. (Scanner releasd in 1996).
*Series 700 ID Station* (visited Nov. 17, 1999) <http://www.ultra–scan.com/700.htm>, 3 pages. (Scanner released in 1998).
*Identix: The Corporation* (visited Nov. 17,1999) <http://www.identix.com/corporate/home.htm>, 2 pages, Copyright 1996–1998.
*Biometric Imaging Products* (visited Nov. 17, 1999) <http://www.identix.com/products/bioimage.htm>, 1 page, Copyright 1996–1998.
*TouchPrint™ 600 Live–Scan System* (visited Nov. 17, 1999) <http://www.identix.com/products/livescan.htm>, 4 pages, copyright 1996–1998.
*TouchPrint™ 600 Palm Scanner* (visited Nov. 17, 1999) <http://www.identix.com/products/palmscan.htm>, 3 pages, Copyright 1996–1998.
*TouchPrint™ 600 Card Scan System* (visited Nov. 17, 1999) <http://www.identix.com/products/cardscan.htm>, 3 pages, Copyright 1996–1998.

*DERMALOG KEY—The safest and easiest way of access control* (Last updated Jul. 18, 1998) <http://www.dermalog.de/Britain/Products/Key/key.htm>, 1 page.

*DERMALOG Finger–ID Your small size solution for high security* (Last updated Jul. 18, 1998) <http://www.dermalog.de//Britain/Products/Finger/fingerid.htm>, 1 page.

*Mytec: Corporate* (visited Nov. 17, 1999) <http://www.mytec.com/corporate/>, 2 pages.

*Kinetic Sciences Inc. Fingerprint Biometrics Division* (visited Nov. 17, 1999) <http://www.kinetic.bc.ca/main–FP–B.html>, 1 page.

*Fingerprint Biometrics: Securing The Next Generation*, May 19, 1999, (visited Nov. 17, 1999) <http://www.secugen.com/pressrel.htm>, 2 pages.

*Secugen Unveils Fully Functional Fingerprint Recognition Solutions*, May 11, 1999, (visited Nov. 17, 1999) <http://www.secugen.com/pressrel.htm>, 3 pages.

*POLLEX Technology Ltd., The Expert in Fingerprint Identification—POLLog* (visited Nov. 17, 1999) <http://www.pollex.ch/english/products/pollog.htm>, 2 pages.

*Sony Fingerprint Indentification Terminal* (visited Nov. 17, 1999) <http://www.iosoftware.com/biosols/sony/fiu/applications/fit100.htm>, 2 pages.

*Sony Fingerprint Identification Unit (FIU–700)* (visited Nov. 17, 1999) <http://www.iosoftware.com/biosols/sony/fiu70/index.htm>, 2 pages. (Unit available late 1999).

*Sony Fingerprint Identification Unit* (visited Nov. 17, 1999) <http://www.iosoftware.com/biosols/sony/fiu/index.htm>, 3 pages.

*Fujitsu Fingerprint Recognition Device (FPI–550 )* (visited Nov. 17, 1999) <http://www.iosoftware.com/biosols/fujitsu/fpi550.htm>, 2 pages.

*Mitsubishi MyPass LP–1002* (visited Nov. 17, 1999) <http://www.iosoftware.com/biosols/mitsubishi/mypass.htm>, 2 pages.

*SecureTouch PV—A Personal Password Vault* (visited Nov. 17, 1999) <http://www.biometricaccess.com/securetouch_pv.htm>, 1 page.

*Digital Descriptor Systems, Inc.—Profile* (visited Nov. 17, 1999) <http://www.ddsi–cpc.com/pages/profile.html>, 3 pages.

*Press Release: Printrak International Announces New Portable Fingerprint ID Solution*, Dec. 10, 1996, (visited Nov. 17, 1999) <http://www.scott.net/~dg/25.htm>, 3 pahes.

*Corporate Profile* (visited Nov. 17, 1999) <http://www.printrakinternational.com/corporate.htm>, 1 page.

*Printrak Products* (visited Nov. 17, 1999) <http://www.printrakinternational.com/Products.htm>, 1 page. (Discusses technology as early as 1974).

Verifier™ 200 Fingerprint Capture Devices, Cross Match Technologies, Inc., 2 pages, 1996–1997.

Verifier 200 Direct Fingerprint Reader, Cross Check Corporation, 2 pages, 1996–1997.

Verifier™ 250 Fingerprint Capture Devices, Cross Match Technologies, Inc. 2 pages, 1996–1997.

Verifier 250 Small Footprint Direct Fingerprint Reader, Cross Check Corporation, 2 pages., 1996–1997.

Verifier™ 290 Fingerprint Capture Devices, Cross Match Technologies, Inc., 2 pages., 1996–1997.

Verifier 290 Direct Rolled Fingerprint Reader, Cross Check Corporation, 2 pages, 1996–1997.

Verifier™ 500 Fingerprint Capture Devices, Cross Match Technologies, Inc., 2 pages, 1998.

Biometric terminal, 1 page.

10–Print Imaging System, Cross Check Corporation, 2 pages, 1998.

*Cross Match Technologies, Inc.* (visited Mar. 25, 1999) <http://www.crossmatch.net/ , 1 page

*Cross Match Technologies, Inc.—Products Overview* (visited Mar. 25, 1999) <http://www.crossmatch.net/new/products/product–index.html>, 1 page.

*Cross Match Technologies, Inc.—Law Enforcement Systems* (visited Mar. 25, 1999) <http://www.crossmatch.net/new/law/law–index.html>, 2 pages.

*Cross Match Technologies, Inc.—Commercial Systems: Building On The Standard* (visited Mar. 25, 1999) <http://www.crossmatch.net/new/commercial/commercial–index.html>, 2 pages.

*Cross Match Technologies, Inc.—International Sales* (visited Mar. 25, 1999) <http://www.crossmatch.net/new/sales/sales–index.html>, 1 page.

*Cross Match Technologies, Inc.—Support* (visited Mar. 25, 1999) <http://www.crossmatch.net/new/support/support–index.html>, 1 page.

*Cross Match Technologies, Inc.—News—Press Releases—Verifier 400 Press Release* (visited Mar. 25, 1999) <http://www.crossmatch.net/new/news/news–pr–050798.html>, 1 page.

*Global Security Fingerscan™ System Overview* (visited Jan. 11, 2000) <http://wwwu–net.com/mbp/sol/g/a9.htm>, 12 pages.

Copy of International Search Report for PCT/US99/12663, 7 pages.

\* cited by examiner

ACCESS CONTROL UNIT INTERFACE

BACKGROUND OF THE INVENTION

1. Field of the Invention

The present invention is directed to the field of access control and, in particular, to access control with biometric technology.

2. Related Art

Access control systems are used to limit access to selected individuals. Some of these systems use biometric technologies to determine whether access for an individual will be granted or denied. A biometric is a unique, measurable characteristic or trait of a human being for automatically recognizing or verifying identity. For instance, fingerprint biometrics are largely regarded as an accurate method of biometric identification and verification. See, e.g., Roethenbaugh, G. Ed., *Biometrics Explained* (International Computer Security Association: Carlisle, Pa. 1998), pages 1–34, which is herein incorporated by reference in its entirety.

Access control units (ACUs) may be placed locally to perform a biometric analysis on the individual, and determine whether access will be granted or denied. Additionally, if required, an ACU may be used to document images of the access applicant. When an access applicant has been denied access, images of an access applicant may be desirable to determine whether the system is being tested for breach. Furthermore, images of an access applicant may be desirable when an access applicant has been accepted and is being granted access (i.e., the door is open), in order to determine whether an access applicant is gaining access and passing it to another ("pass forward"), whether multiple people are obtaining access, or whether property is being improperly transported through the door.

An access control unit takes a live scan of an individual's fingerprint with a fingerprint scanner. A host processor processes the detected fingerprint image. Such live scan ability is an important tool for access control, allowing for rapid capture and transmission of fingerprints, and rapid fingerprint identification. Prior to the present invention, however, the host processor in an ACU was limited to a customized piece of logic, such as, an application specific-integrated circuit (ASIC) or a digital signal processor (DSP). An ACU was also not a generally compact device.

What is needed is a compact ACU interface which is compatible with a commercial off-the-shelf (COTS) processor, such as, a PENTIUM processor. Such a COTS processor is more likely to be familiar to an ACU customer, and able to operate a common commercial operating system such as WINDOWS or LINUX, thereby increasing customer acceptance throughout the life of the ACU from the time of purchase through installation and maintenance. A COTS processor may be more widely available at an overall competitive price and performance compared to customized logic. A compact ACU also allows it to be incorporated into a wider range of access control applications, such as, prison security points and entry/exit locations in a secure building or area, and allows it to be integrated more easily with existing computer systems. Furthermore, it is desirable to have an ACU that is compatible with a broader range and variety of communications interfaces. The placement of intelligence in a small package at access points enables local and distributed alarms for tamper detection and breach.

SUMMARY OF THE INVENTION

The present invention is directed to an access control unit interface between a fingerprint scanner, a camera, and peripherals, and a host processor. A daughter card is coupled between the fingerprint scanner and the host processor. The daughter card handles real-time and interactive access control events. The host processor can be any commercially available processor.

In one embodiment, the daughter card has an access control interface processor. The access control interface processor includes a display interface module, a keyboard module, a Wiegand interface module, a finger detect interface module, a LED interface module, and a serial communication module.

The present invention further provides for a very compact design configuration. The daughter card and host processor may be coupled in a compact stacked configuration. This allows the access control unit to be installed in a variety of environments without using a great deal of space. User enrollment and access control are provided for in a convenient package.

Furthermore, the present invention provides an access control interface between a fingerprint scanner, camera, and peripherals, and any commercially available (COTS) host processor. This provides for greater flexibility in access control system design and implementation. Various commercially available processors can be chosen to meet different performance and/or cost needs. For example, familiar, low-cost host processors may be chosen to lower overall system cost. Off-the-shelf processors may be available in large quantities to support large production runs.

According to a further feature, the present invention provides for interconnection with a number of interface types, including a Wiegand interface, a serial port interface, and an Ethernet port interface. This provides for flexibility in interconnection environments. Interfacing directly with Ethernet provides for high rates of fingerprint data transfer.

Further embodiments, features, and advantages of the present inventions, as well as the structure and operation of the various embodiments of the present invention, are described in detail below with reference to the accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

In the drawings.

Figure 1:
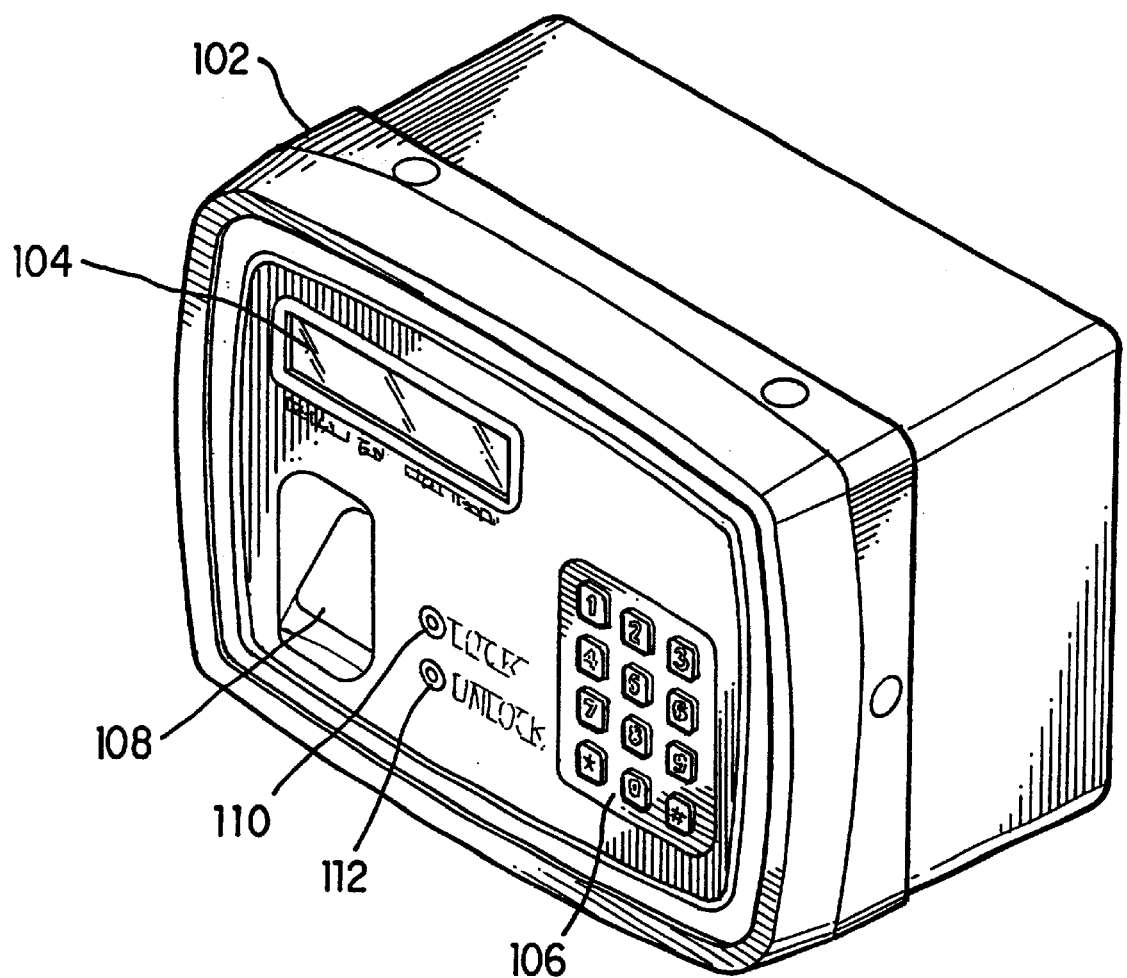
FIG. 1 shows an example embodiment of an access control unit of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Overview and Terminology

The present invention is directed to an interface between a fingerprint scanner and a host processor in an access control unit. The host processor can be any commercially available processor. In a preferred embodiment, a daughter card is coupled between the fingerprint scanner and various accessories, and the host processor. The daughter card handles real-time and interactive access control events. In a preferred embodiment, the daughter card includes an access control interface processor. The access control interface processor performs a number of tasks, including interfacing the host processor with various I/O devices and ports.

To more clearly delineate the present invention, an effort is made throughout the specification to adhere to the following term definitions as consistently as possible.

The terms "commercially available processor" and "commercial-off-the-shelf (COTS) processor" are used interchangeably to refer to any processing unit available for general purpose or specific purpose computing. For example, a COTS processor can include, but is not limited to, a PC-104 processor, a PENTIUM processor type sold by Intel Corporation or a PowerPC processor sold by Motorola. A COTS processor is also intended to broadly refer to any combination of software, firmware, and/or hardware, including, but not limited to, DSPs, RISCs (Reduced Instruction Set Computers), and microprocessors.

Example Access Control Unit

FIG. 1 illustrates a frontal perspective view of an embodiment of an access control unit 100. Access control unit 100 includes an ACU case 102, a display 104, a keypad 106, a fingerprint scanner 108, a locked LED display 110, and a unlocked LED display 112. Access control unit 100 is not limited to this configuration, but may also include other combinations of I/O devices and ports as would be known by persons skilled in the relevant art(s), based upon the teachings herein.

ACU case 102 provides a housing for some of the components necessary to operate access control unit 100, and presents the I/O devices and ports of access control unit 100. Display 104 provides status information to an individual accessing the access control unit 100. Display 104 may be an LCD display, or any other suitable display device. Keypad 106 allows an individual to input an access code to the access control unit 100. For example, keypad 106 allows for 1:1 verification or 1:some identification to occur within the unit. Keypad 106 may be any suitable type of keypad, keyboard, or other key entry device.

Fingerprint scanner 108 captures a user's fingerprint. Fingerprint scanner 108 may be any suitable type of fingerprint scanner, known to persons skilled in the relevant art(s).

Locked LED display 110 indicates that access is currently being denied. Unlocked LED display 112 indicates that a user is currently being granted access. The present invention is not limited to the use of LEDs, but may also include other suitable indicator devices known to those skilled in the relevant arts. Additional visual, audible, or other types of indicators may be used to denote further access control unit status details.

The present invention is described in terms of this example access control unit environment. However, the present invention can be used in any access control interface where a daughtercard couples a biometric input device, I/O device(s) and other interfaces with a COTS processor.

Description in these terms is provided for convenience only. It is not intended that the invention be limited to application in this example environment. In fact, after reading the following description, it will become apparent to a person skilled in the relevant art how to implement the invention in alternative environments known now or developed in the future.

Access Control Unit Interface

Structural implementations for an access control unit interface are described at a high-level, and at a more detailed level. These structural implementations are described herein for illustrative purposes, and are not limiting. In particular, the access control unit interface described in this section can be achieved using any number of structural implementations, including hardware, firmware, software, or any combination thereof. The details of such structural implementations will be apparent to persons skilled in the relevant art(s) based on the teachings contained herein.

Figure 2A:
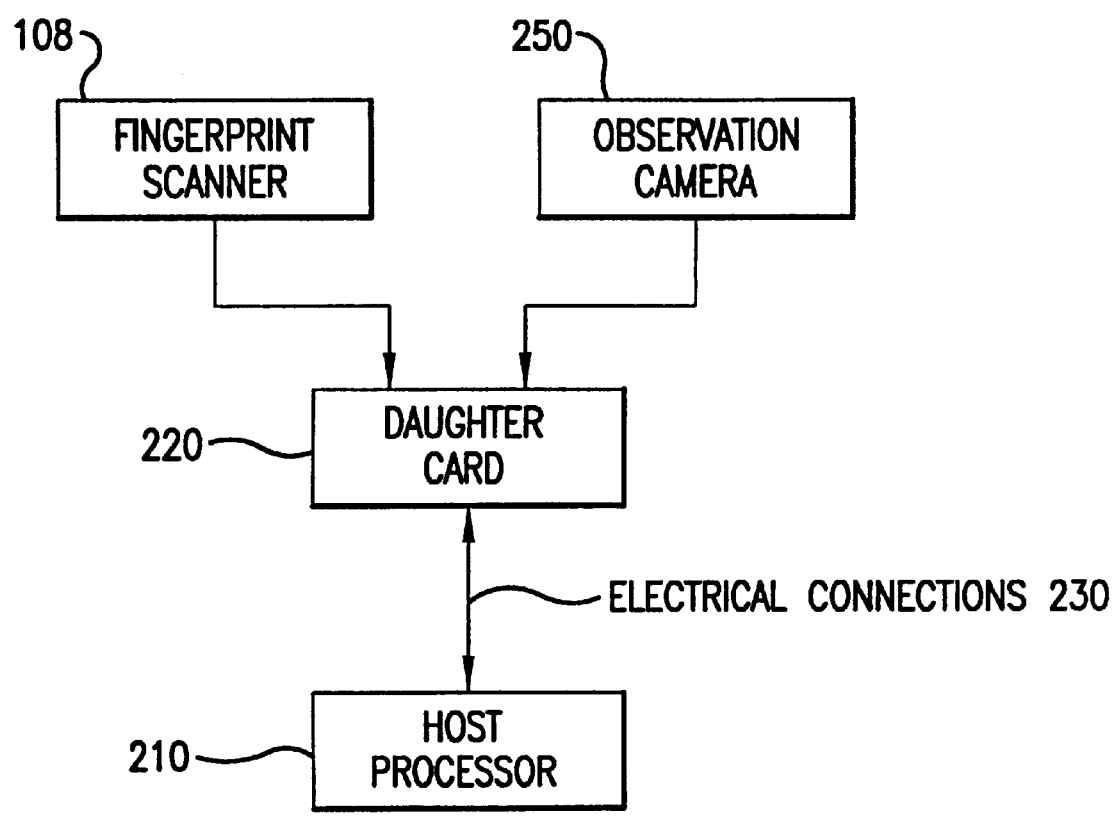
FIG. 2A shows a block diagram illustrating an embodiment of the present invention.

FIG. 2A illustrates an example block diagram of a preferred embodiment of the present invention. Access control unit 200 includes a host processor 210, a daughter card 220, a fingerprint scanner 108, electrical connections 230, and observation camera 250. Host processor 210 is bi-directionally coupled to daughter card 220 through electrical connections 230.

Figure 2B:
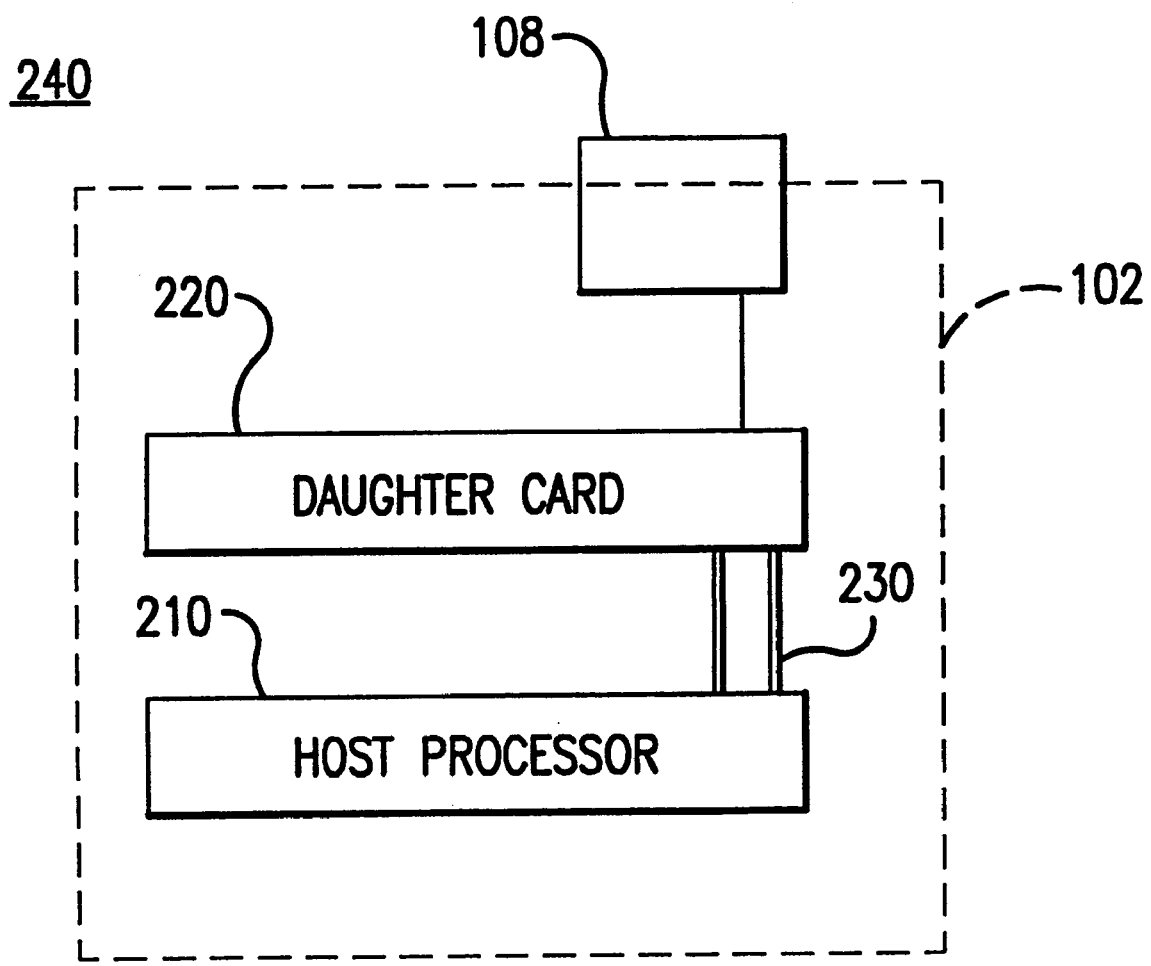
FIG. 2B shows an example configuration of the present invention.

FIG. 2B shows an example access control unit daughter card and host processor physical connection configuration 240. Configuration 240 includes a host processor 210, a daughter card 220, a fingerprint scanner 108, electrical connections 230, and an ACU case 102. As illustrated, host processor 210, daughter card 220, and electrical connections 230 form a substantially stacked configuration in ACU case 102. This is a compact arrangement, which allows for a compact size for ACU case 102. In one example, daughter card 220 is fabricated on a circuit board approximately 3.5 inches×3.5 inches or less.

Figure 3:
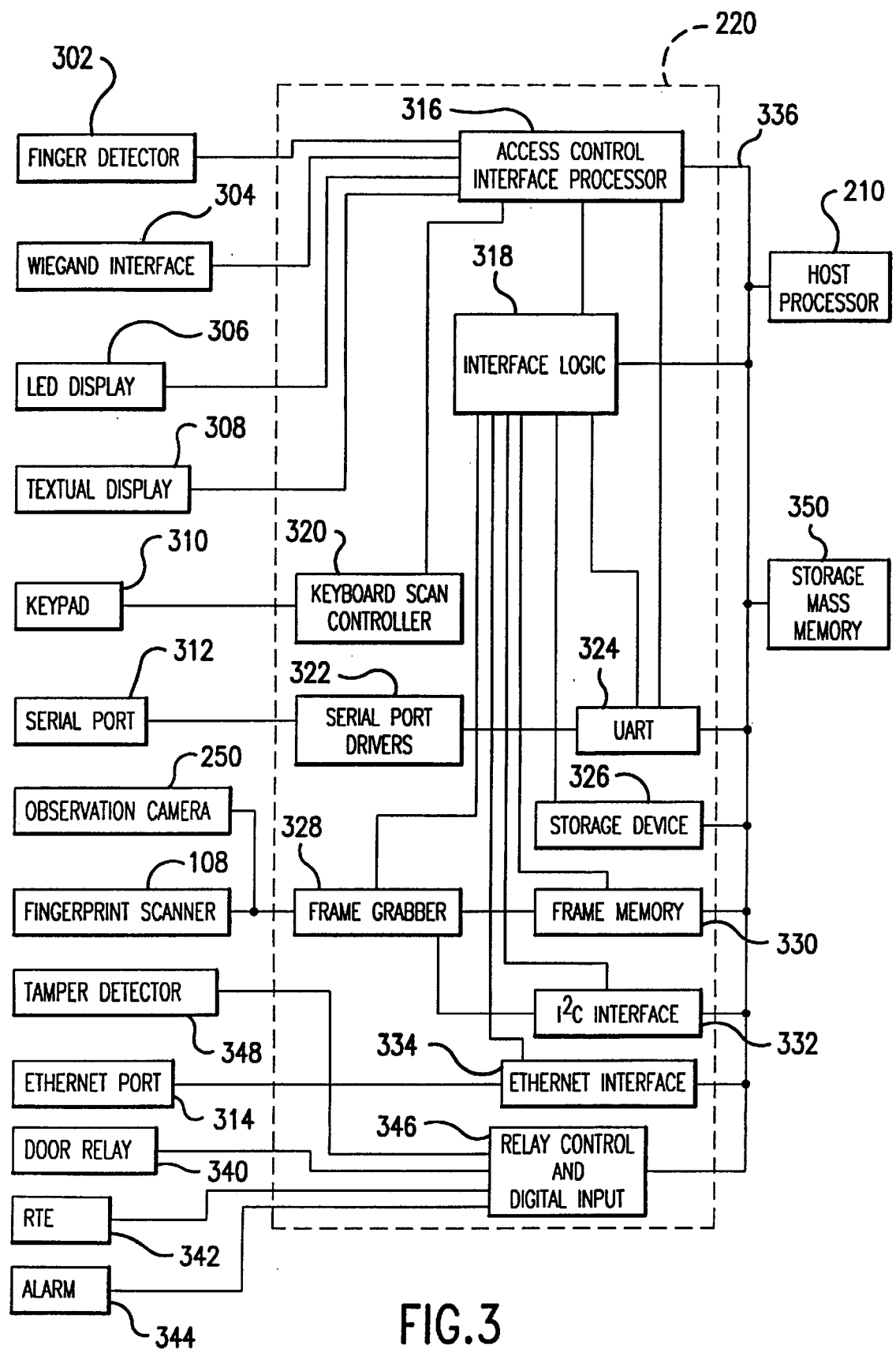
FIG. 3 shows an example detailed block diagram illustrating an embodiment of the present invention.

FIG. 3 shows a more detailed block diagram of an embodiment of an access control unit. The access control unit of FIG. 3 includes a host processor 210, a daughter card 220, a finger detector 302, a Wiegand interface 304, a LED display 306, a textual display 308, a keypad 310, a serial port 312, a fingerprint scanner 108, an Ethernet port 314, a door relay 340, a RTE (Request to Exit) 342, an alarm 344, a tamper detector 348, and a storage mass memory 350. Daughter card 220 farther includes an access control interface processor 316, an interface logic 318, a keyboard scan controller 320, a serial port drivers 322, a UART (Universal Asynchronous Receiver Transmitter) 324, a storage device 326, a frame grabber 328, a frame memory 330, an $I^2C$ (Inter-IC) interface 332, an Ethernet interface 334, a bus 336, and a relay control and digital input 346.

Access control interface processor 316 is coupled to bus 336, finger detector 302, Wiegand interface 304, LED display 306, textual display 308, keyboard scan controller 320, interface logic 318, and UART 324.

Keyboard scan controller 320 is coupled to keypad 310 and access control interface processor 316.

Serial port drivers 322 is coupled to serial port 312 and UART 324.

UART 324 is coupled to access control interface processor 316, serial port drivers 322, interface logic 318, and bus 336.

Interface logic 318 is coupled to access control interface processor 316, UART 324, storage device 326, frame grabber 328, frame memory 330, $I^2C$ interface 332, Ethernet interface 334, and bus 336.

Storage device 326 is coupled to interface logic 318 and bus 336.

Frame grabber 328 is coupled to fingerprint scanner 108, interface logic 318, frame memory 330, I²C interface 332, and observation camera 250.

Frame memory 330 is coupled to interface logic 318, frame grabber 328, and bus 336.

I²C interface 332 is coupled to interface logic 318, frame grabber 328, and bus 336.

Ethernet interface 334 is coupled to interface logic 318, Ethernet port 318, and bus 336.

Relay control and digital input 346 is coupled to door relay 340, RTE 342, alarm 344, tamper detector 348, and bus 336.

Host processor 210 is coupled through bus 336 to access control interface processor 316, interface logic 318, UART 324, storage device 326, frame memory 330, I²C interface 332, Ethernet interface 334, and relay control and digital input 346. In alternative embodiments, fewer devices, or additional devices are coupled through bus 336 to host processor 210.

Storage mass memory 350 is coupled through bus 336 to access control interface processor 316, interface logic 318, UART 324, storage device 326, frame memory 330, I²C interface 332, Ethernet interface 334, and relay control and digital input 346. In alternative embodiments, fewer devices, or additional devices are coupled through bus 336 to storage mass memory 350.

Operation

Host processor 210 of FIG. 3 performs high-level control functions for an access control unit. For instance, host processor 210 provides the necessary control signals to daughter card 220 to cause a fingerprint image to be captured. Host processor 210 receives the captured fingerprint image and matches it to one or more previously stored fingerprints. One-to-one or one-to-many matching algorithms can be used to determine a match. Host processor 210 comprises any commercially available processor. In a preferred embodiment, host processor 210 comprises a PC-104 processor.

Host processor 210 interfaces with daughter card 220 through bus 336. In a preferred embodiment, bus 336 comprises an ISA (Industry Standard Architecture) bus, which is well known to those skilled in the relevant art(s).

Finger detector 302, shown in FIG. 3, detects when a finger is present at fingerprint scanner 108. In one example embodiment, finger detector 302 includes an interrupter beam. In alternative embodiments, finger detector 302 may detect skin resistance, or measure characteristics of light reflected off skin, in order to detect a live finger, as would be understood by persons skilled in the relevant art(s).

Fingerprint scanner 108 images a user's fingerprint. In an embodiment, fingerprint scanner 108 outputs fingerprint data representative of the captured fingerprint image in a video format. In general, any known fingerprint scanner can be used.

Observation camera 250 captures images of an access applicant when desired. Images may be captured when access is denied or granted. In an embodiment, observation camera 250 outputs images captured at periodic intervals, in a video format. In general, any suitable camera may be used.

Frame grabber 328, frame memory 330, and I²C interface 332 operate together to capture fingerprint images of fingerprint scanner 108 and access applicant images of observation camera 250. In an embodiment, frame grabber 328 digitizes the video signals output by fingerprint scanner 108 and observation camera 250. A captured image is stored in frame memory 330. In one example, frame memory 330 is a static random access memory (SRAM). Host processor 210 accesses frame memory 330 to obtain captured fingerprint images and access applicant images, through bus 336.

In an embodiment, frame grabber 328 comprises an integrated circuit chip, such as a BT827, which accepts video sources to be digitized, stored, and analyzed. Such sources include fingerprint scanner 108 and observation camera 250. Control and status registers within an BT827 can only be accessed over an I²C interface. I²C interface 332 allows host processor 210 to access these registers through bus 336. Other suitable frame grabbers and associated circuits can be used as would be apparent to person(s) skilled in the relevant art(s) given this description.

UART 324 provides a communications interface between host processor 210 and serial drivers 322. In a preferred embodiment, UART 324 provides an ISA interface to serial drivers 323. UART 324 also provides a communications interface between host processor 210 and access control interface processor 316. In a preferred embodiment, UART 324 provides an ISA interface between host processor 210 and access control interface processor 316. UARTs are well known to those skilled in the relevant art(s).

Storage device 326 provides for data storage on the daughter card 220. In a preferred embodiment, storage device 326 is a flash memory device designed to emulate a hard drive in the manner that a host processor, such as a personal computer, accesses data. This provides for convenient access by commercially available processors. Interface logic 318 decodes addresses provided by host processor 210 over bus 336, and provides the decoded addresses to storage device 326. Storage device 326 outputs data onto bus 336.

Door relay 340 is a relay or switch that allows an access door to be opened. In an embodiment, relay control and digital input 346 provides the control signal that activates door relay 340.

RTE 342 allows an access door to be opened from the inside, rather than the side of the door monitored by an access control unit. In an embodiment, when accessed, RTE 342 provides a signal to relay control and digital input 346 indicating a request to exit.

Alarm 344 provides an alarm indication during specified situations. For instance, alarm 344 may be active when a door is left open for more than a specified amount of time, or when an attempt is made to force a door open. Alarm 344 receives an activation signal from relay control and digital input 346.

Tamper detector 348 detects when an access control unit is being tampered with. For instance, tamper detector 348 may provide an active signal when an improper attempt is made to open the access control unit. Tamper detector 348 provides a signal to relay control and digital input 346 that indicates tampering.

Relay control and digital input 346 provides a control signal to door relay 340, and provides and receives other signals. In an embodiment, relay control and digital input 346 receives signals from tamper detector 348, RTE 342, and provides a signal to alarm 344. In other embodiments, relay control and digital input 346 may receive additional input signals, or have fewer input signals, and provide additional or fewer output signals. In embodiments, relay control and digital input 346 provides output signals to, and receives input signals from host processor 210 through bus 336.

Storage mass memory 350 provides mass storage for host processor 210 and daughter card 220. In an embodiment, storage mass memory 350 stores fingerprint images. In an alternative embodiment, storage mass memory 350 stores images captured periodically by observation camera 250 until they can be transmitted from the access control unit through Ethernet port 314. Storage mass memory 350 may provide these functions, combinations of these functions, and other functions well known to persons skilled in the relevant art(s).

Input/Output Devices and Interfaces

In one embodiment, Wiegand interface 304 allows the present invention to interface with a Wiegand communications line.

LED display 306 includes LEDs that indicate that access is currently being granted or denied.

Textual display 308 provides status information to an individual accessing the access control unit. In a preferred embodiment, textual display 308 is an LCD display. Other textual displays are well known to persons skilled in the relevant art(s).

Keypad 310 allows an individual to input an access code to the access control unit 100, allowing for 1:1 verification or 1:some identification to occur within the unit. In embodiments, there may be more than one level of access. For instance, an embodiment may have two levels of access: user access and system administration access.

Keyboard scan controller 320 scans keypad 310 for key data. Suitable keyboard scan controllers are known to persons skilled in the relevant art(s).

Serial port 312 provides a serial interface to an access control unit, supporting multiple communication protocols. These include, but are not limited to, RS-232, RS-422, and RS-485. Serial port drivers 322 convert data to the appropriate electrical signal levels. Suitable serial port drivers are known to persons skilled in the relevant art(s).

Ethernet interface 334 allows an access control unit to transmit and receive large quantities of data at high speed, such as fingerprint images and observation images. In an embodiment, interface logic 318 decodes controls signals provided by host computer 210 through bus 336, to access Ethernet interface 334. Ethernet port 314 provides an Ethernet connection for Ethernet interface 334.

Interface Logic

In an embodiment, interface logic 318 decodes address and control signals from host processor 210 through bus 336. This allows host processor 210 to access UART 324, storage device 326, $I^2C$ interface 332, and Ethernet interface 334. Interface logic 318 also provides logic which enables frame grabber 328 to write data into storage device 326. Additionally, interface logic 318 provides logic to disable frame grabber 328 from writing to storage device 326, and to allow host processor 210 access to storage device 326. Interface logic 318 also provides logic for configuring the protocol of serial port drivers 322.

Interface logic 318 can be comprised of hardware, firmware, software, or a combination thereof. Preferably, interface logic 318 is comprised of at least one complex programmable logic device (CPLD), such as those provided by Cypress Semiconductor. CPLDs at least provide for a high level of logic density.

Access Control Interface Processor

Figure 4:
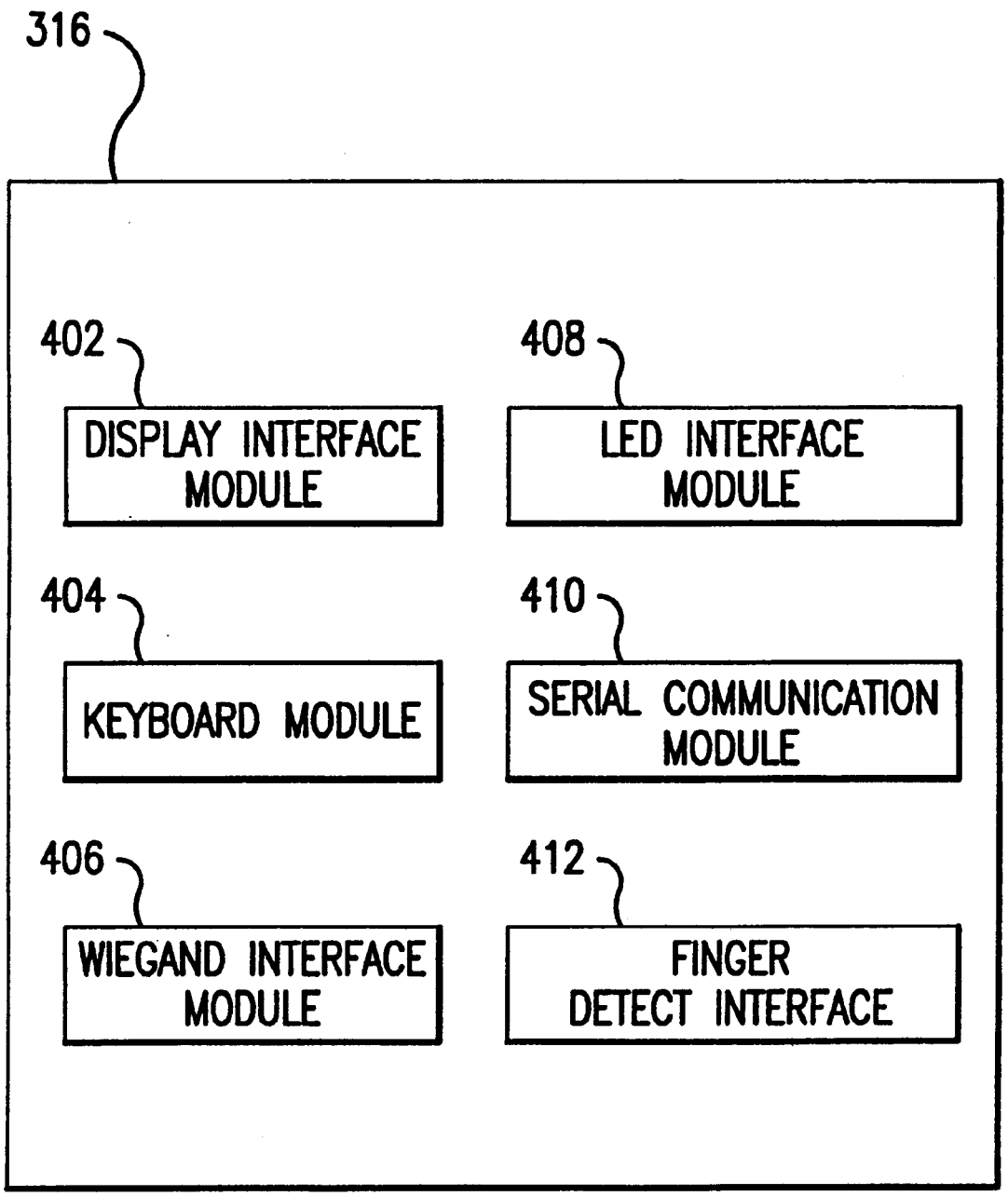
FIG. 4 shows example modules in an embodiment of the access control interface processor of the present invention.

In an embodiment, access control interface processor 316 provides for lower level processing and interfacing functions on daughter card 220. For instance, access control interface processor 316 receives instructions from host processor 210 through bus 336, and transmits responses (solicited and unsolicited) to host processor 210 through bus 336. Access control interface processor 316 may provide additional and alternative functions. As shown in FIG. 4, in an embodiment, access control interface processor 316 includes a display interface module 402, a keyboard interface module 404, a Wiegand interface module 406, a LED interface module 408, a serial communication module 410, and a finger detect module 412.

Display interface module 402 couples textual display 308 with host processor 210. In an embodiment, display interface module 402 receives display commands with associated data from host processor 210, and allows host processor 210 to write to, to clear, and to control the cursor of textual display 308.

Keyboard interface module 404 interfaces keyboard scan controller 320 with host processor 210. In an embodiment, keyboard interface module 404 may allow the transmitting of solicited or non-solicited keypad input from keyboard scan controller 320 to host processor 210.

Wiegand interface module 406 couples Wiegand interface 304 and host processor 210, allowing data to be transmitted and received through Wiegand interface 304.

LED interface module 408 couples LED display 306 and host processor 210. In an embodiment, LED interface module 408 allows host processor 210 to cause LED display 306 to illuminate LEDs indicating that access has been granted and that access has been denied.

Serial communication module 410 couples serial port drivers 322 and host processor 210. In an embodiment, serial communications module 410 allows host processor 210 to send serial data to, and receive serial data from serial port drivers 322 through UART 324.

Finger detect module 412 couples finger detector 302 and host processor 210. In an embodiment, finger detect module 412 allows finger detector 302 to provide signals to host processor 210 indicating that a finger is present, or that a finger is not present.

Figure 5A:
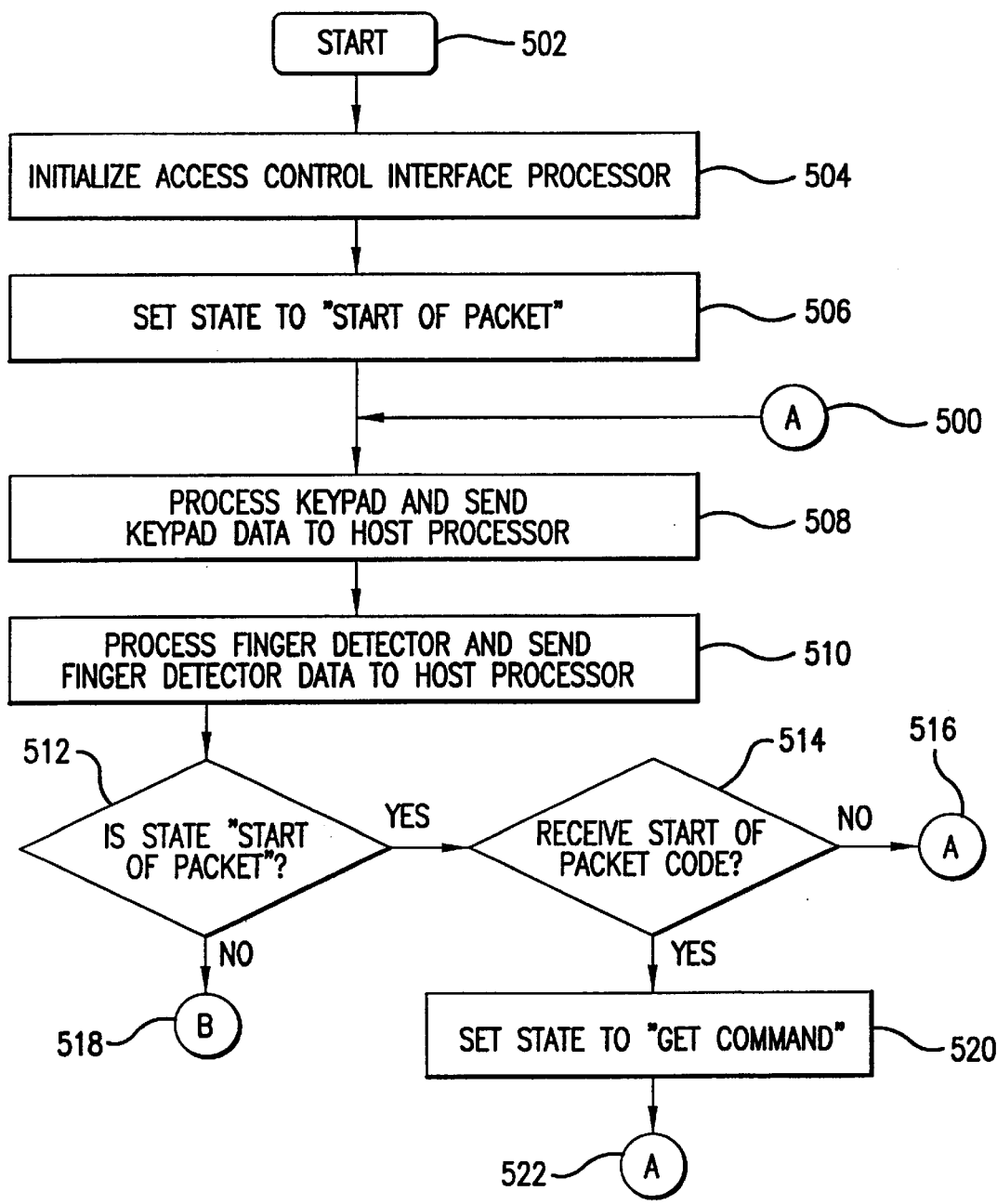
FIGS. 5A, 5B and 5C show example operation of an access control interface processor of the present invention.
Figure 5B:
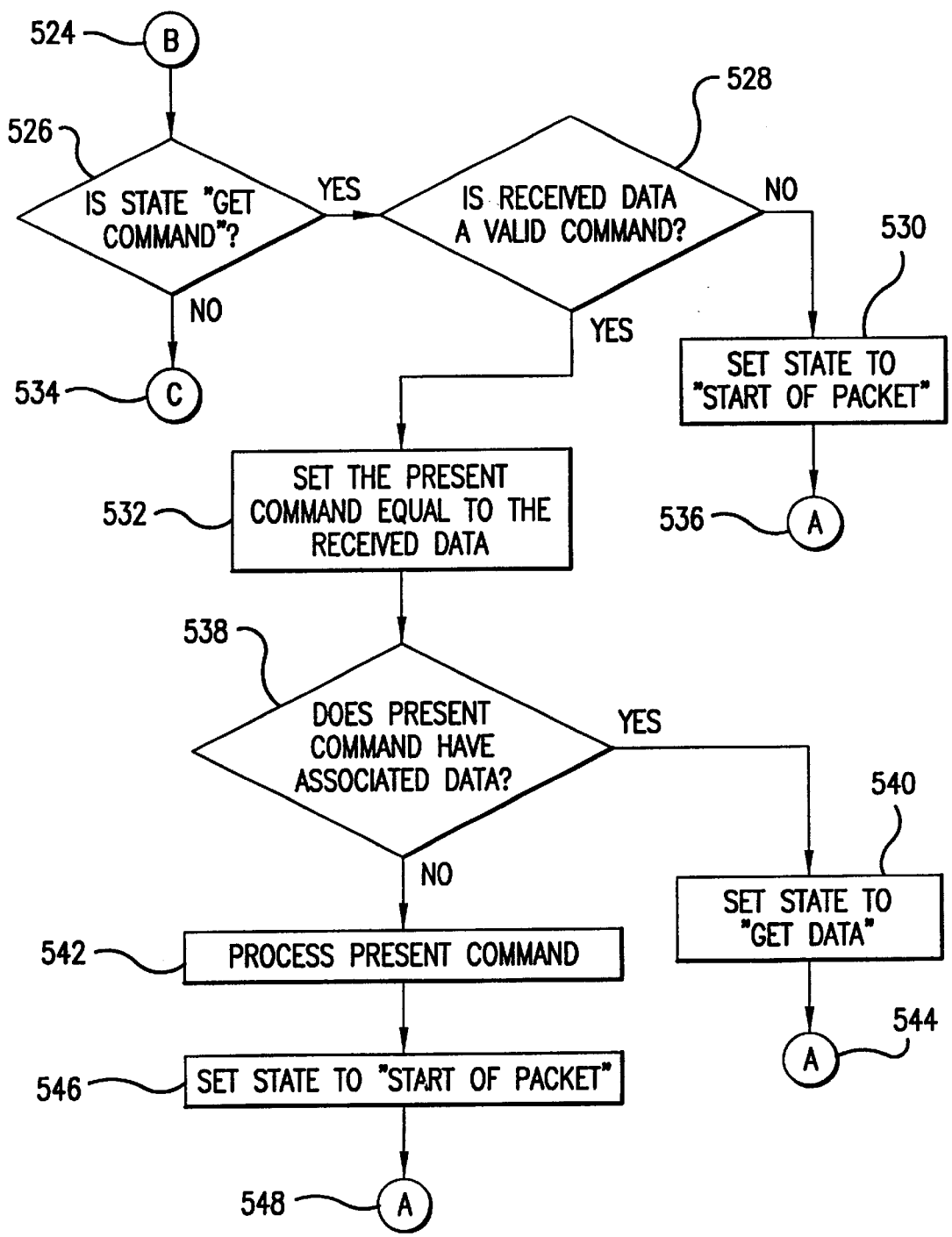
Figure 5C:
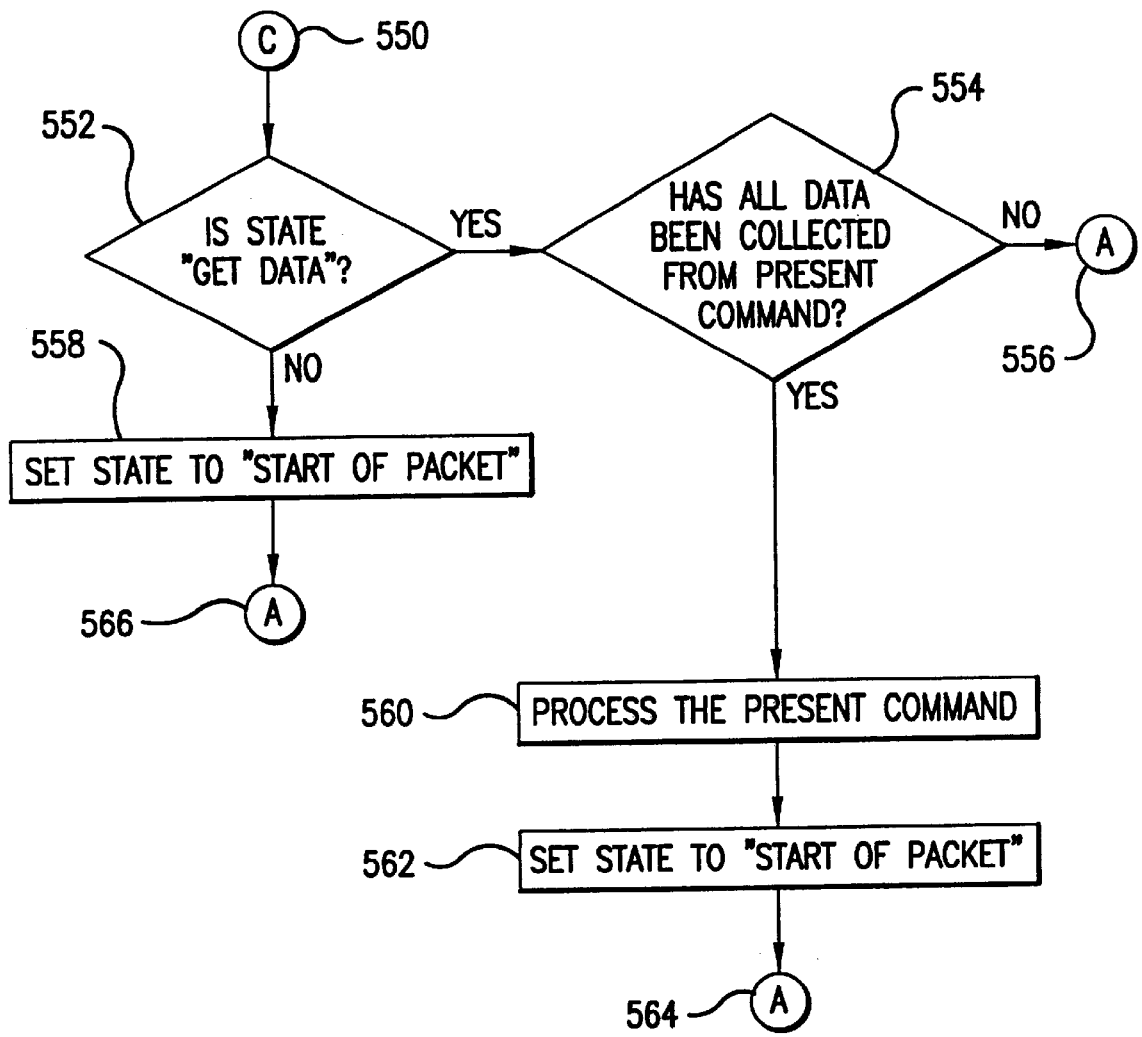

FIGS. 5A–5C show flowcharts providing detailed operational steps of an example embodiment of access control interface processor 316. The steps of FIGS. 5A–5C may be implemented in hardware, firmware, software, or a combination thereof. Other structural embodiments will be apparent to persons skilled in the relevant art(s) based on the discussion contained herein. These steps are described in detail below.

In step 500 in FIG. 5A, operation proceeds to step 508.

Operation of access control interface processor 316 starts at step 502. Operation proceeds to step 504.

In step 504, access control interface processor 316 is initialized. Operation proceeds to step 506.

In step 506, the state of access control interface processor 316 is set to "Start of Packet". Operation proceeds to step 508.

In step 508, keypad scan controller 320 is processed by access control interface processor 316, determining whether keypad data has been entered at keypad 310, and the resulting data is sent to the host computer 210. Operation proceeds to step 510.

In step 510, finger detector 302 is processed by access control interface processor 316, determining whether a finger has been detected, and the result is sent to host computer 210. Operation proceeds to step 512.

In step 512, the state of access control interface processor 316 is determined by access control interface processor 316. If the state is equal to "Start of Packet", operation proceeds to step 514. If the state is not equal to "Start of Packet", operation proceeds to step 518.

In step 514, access control interface processor 316 determines whether the start of packet code has been received from host computer 210. If the start of packet code has been received, operation proceeds to step 520. If the start of packet code has not been received, operation proceeds to step 516.

In step 516, operation proceeds to step 500, indicated by an "A".

In step 518, operation proceeds to step 524 in FIG. 5B, indicated by a "B".

In step 520, the state of access control interface processor 316 is set to "Get Command". Operation proceeds to step 522, indicated by an "A".

In step 522, operation proceeds to step 500.

In step 524 in FIG. 5B, operation proceeds to step 526.

In step 526, access control interface processor 316 determines whether the state is set equal to "Get Command". If the state is equal to "Get Command", access control interface processor receives data from host processor 210, and operation proceeds to step 528. If the state is not equal to "Get Command", operation proceeds to step 534.

In step 528, access control interface processor 316 determines whether valid data is received. If valid data is received, operation proceeds to step 532. If valid data is not received, operation proceeds to step 530.

In step 530, the state of access control interface processor 316 is set to "Start of Packet" by access control interface processor 316. Operation proceeds to step 500 in FIG. 5A, indicated by an "A".

In step 532, access control interface processor 316 sets the present command equal to the data received. Operation proceeds to step 538.

In step 534, operation proceeds to step 550 in FIG. 5C, indicated by a "C".

In step 536, operation proceeds to step 500 in FIG. 5A, indicated by an "A".

In step 538, access control interface processor 316 determines whether the present command has data associated with it. If the present command does have data associated with it, operation proceeds to step 540. If the present command does not have data associated with it, operation proceeds to step 542.

In step 540, the state of access control interface processor 316 is set to "Get Data" by access control interface processor 316. Operation proceeds to step 544.

In step 542, the present command is processed. Operation proceeds to step 546.

In step 544, operation proceeds to step 500 in FIG. 5A, indicated by an "A".

In step 546, the state of access control interface processor 316 is set to "Start of Packet" by access control interface processor 316. Operation proceeds to step 548.

In step 548, operation proceeds to step 500 in FIG. 5A, indicated by an In step 550 in FIG. 5C, operation proceeds to step 552.

In step 552, access control interface processor 316 determines whether the state of access control interface processor 316 is set to "Get Data". If the state is set to "Get Data", operation proceeds to step 554. If the state is not set to "Get Data", operation proceeds to step 558.

In step 554, access control interface processor 316 determines whether all data has been collected from the present command. If all data has been collected from the present command, operation proceeds to step 560. If all data has not been collected from the present command, operation proceeds to step 556.

In step 556, operation proceeds to step 500 in FIG. 5A, indicated by an "A".

In step 558, access control interface processor 316 sets the state of access control interface processor 316 to "Start of Packet". Operation proceeds to step 566.

In step 560, access control interface processor 316 processes the present command. Operation proceeds to step 562.

In step 562, access control interface processor 316 sets the state of access control interface processor 316 to "Start of Packet". Operation proceeds to step 564.

In step 564, operation proceeds to step 500 in FIG. 5A, indicated by an "A".

In step 566, operation proceeds to step 500 in FIG. 5A, indicated by an "A".

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. an access control unit, comprising:
    a fingerprint scanner;
    a host processor; and
    a daughter card coupled between the fingerprint scanner and the host processor;
    wherein said daughter card and host processor are configured in a stacked configuration;
    wherein said daughter card receives fingerprint image data from said fingerprint scanner and stores said received fingerprint data; and
    wheren said daughter card transmits said received fingerprint image data to said host processor, wherein the host processor can be any commercially available processor;
    wherein said daughter card further comprises
        an access control interface processor; and
        wherein said access control interface processor receives instructions from said host processor and transmits responses to said host processor; and
        wherein said access control interface processor comprises;
            a display interface;
            a keyboard module;
            a Wiegand interface module;
            a finger detect interface module;
            an indicator interface module; and
            a serial communication module.

2. The access control unit of claim 1, wherein said daughter card handles real-time and interactive access control events.

3. The access control unit of claim 2, wherein said daughter card includes an access control interface processor.

4. The access control unit of claim 1, wherein said daughter card comprises:
    an access control interface processor;
    a keyboard scan controller;
    a serial port driver;
    a frame grabber;
    a UART;
    a storage unit;
    a frame memory unit;
    an $I^2C$ interface;
    a relay control and digital input;
    an Ethernet interface; and
    interface logic, wherein said daughter card is coupled between at least one device and a host processor.

5. The access control unit of claim 1, wherein said daughter card is coupled between an Ethernet port and said host processor.

6. The access control unit of claim 1, wherein said daughter card is coupled between a Wiegand interface and said host processor.

7. The access control unit of claim 1, wherein said daughter card is coupled between at least one I/O device and said host processor.

8. The access control unit of claim 7, wherein said at least one I/O device comprises:

a keypad; and a display.

9. The access control unit of claim 1, wherein said daughter card is coupled between a finger detector and said host processor.

10. The access control unit of claim 1, wherein said daughter card is coupled between a serial port and said host processor.

11. The access control unit of claim 1, wherein said daughter card and host processor are electrically connected and arranged in a compact stacked configuration.

12. The access control unit of claim 1, wherein said display interface module receives a data display command from said host processor and sends associated data to a display.

13. The access control unit of claim 1, wherein said keyboard module transmits solicited and non-solicited keypad data to said host processor.

14. The access control unit of claim 1, wherein said Wiegand interface module translates data from said host processor and sends the translated data to a Wiegand interface.

15. The access control unit of claim 1, wherein said finger detect interface module allows a finger detector to provide signals to said host processor indicating that a finger is present, or that a finger is not present.

16. The access control unit of claim 1, wherein said LED interface module allows said host processor to illuminate LEDs indicating that access has been granted and that access has been denied.

17. The access control unit of claim 1, wherein said serial communication module allows said host processor to send serial data to, and receive serial data from serial port drivers.

18. The access control unit of claim 1, wherein said daughter card is coupled between an observation camera and said host processor.

19. The access control unit of claim 1, wherein said daughter card is coupled between a tamper detector and said host processor.

20. The access control unit of claim 1, wherein said daughter card is coupled between a door relay and said host processor.

21. The access control unit of claim 1, wherein said daughter card is coupled between a RTE and said host processor.

22. The access control unit of claim 1, wherein said daughter card is coupled between an alarm and said host processor.

23. The access control unit of claim 1, wherein said daughter card and said host processor are coupled to a mass storage device.

24. The access control unit of claim 1, wherein said daughter card communicates with the host processor across an industry standard bus.

25. The access control unit of claim 20, wherein said daughter card includes relay control.

26. The access control unit of claim 1, wherein said daughter card is disposed in a first plane and said host processor is disposed in a second plane, wherein said first plane and said second plane are substantially parallel;

wherein said daughter card and said host processor are connected by an electrical connection, wherein said daughter card, said electrical connection, and said host processor substantially form a U-shape; and wherein said daughter card and said host processor each comprise a circuit board approximately 3.5 inches by 3.5 inches or less.

27. The access control unit of claim 1, wherein said daughter card handles real-time and interactive access control events, wherein said daughter card includes:

an access control interface processor;

a keyboard scan controller coupled to a keypad;

a serial port driver;

a frame grabber;

a UART;

a storage unit;

a frame memory unit;

an $I^2C$ interface;

a relay control and digital input module that is coupled to a tamper detector, a door relay, an RTE (request to exit), and an alarm;

an Ethernet interface coupled to an Ethernet port; and interface logic;

wherein said daughter card is coupled to an observation camera;

wherein said daughter card and said host processor are coupled to a mass storage device;

wherein said access control interface processor includes:

a display interface module that receives a data display command from said host processor and sends associated data to a display;

a keyboard module that transmits solicited and non-solicited keypad data to said host processor;

a Wiegand interface module that translates data from said host processor and sends the translated data to a Wiegand interface;

a finger detect interface module that allows a finger detector to provide signals to said host processor indicating that a finger is present, or that a finger is not present;

a LED interface module that allows said host processor to illuminate LEDs indicating that access has been granted and that access has been denied; and a serial communication module that allows said host processor to send serial data to, and receive serial data from said serial port driver.

28. An access control interface processor comprising:

a display interface module;

a keyboard module;

a Wiegand interface module;

a finger detect interface module;

a LED interface module; and a serial communication module;

wherein said access control interface is disposed on a daughter card;

wherein the daughter card is coupled between a fingerprint scanner and a host processor;

wherein the host processor can be any commercially available processor;

wherein the daughter card and host processor are configured in an access control unit case; and wherein said access control interface processor receives instructions from the host processor and transmits responses to the host processor.

29. An access control unit comprising:

an access control unit case;

a fingerprint scanner accessible on a surface of said access control unit case;

a host processor; and a daughter card coupled between the fingerprint scanner and the host processor;

wherein said daughter card and host processor are configured in a stacked configuration in said access control unit case;

wherein said daughter card receives fingerprint image data from said fingerprint scanner and stores said received fingerprint image data; and wherein said daughter card transmits said received fingerprint image data to said host processor;

wherein said daughter card further comprises
an access control interface processor; and
wherein said access control interface processor receives instructions from said host processor and transmits responses to said host processor; and
wherein said access control interface processor comprises
a display interface;
a keyboard module;
a Wiegand interface module;
a finger detect interface module;
an indicator interface module; and
a serial communication module.

30. The access control unit of claim 29, further comprising:
an observation camera, said daughter card coupled between said observation camera and said host processor.

31. A method for access control in a device, the device comprising:

a fingerprint scanner;

a host processor;

wherein the host processor can be any commercially available processor; and a daughter card that comprises;
an access control interface processor; and
wherein said access control interface processor receives instructions from said host processor and transmits responses to said host processor;
wherein said access control interface processor comprises
a display interface;
a keyboard module;
a Wiegand interface module;
a finger detect interface module;
an indicator interface module; and
a serial communication module;
said method comprising the steps of:
coupling the daughter card to the host processor;
coupling the fingerprint scanner to the daughter card;
stacking the daughter card and processor in an access control unit case; and
coupling a signal representative of at least a portion of a fingerprint output from the fingerprint scanner through the daughter card to the host processor.

* * * * *